United States Patent [19]

Sato et al.

[11] Patent Number: 4,460,757

[45] Date of Patent: Jul. 17, 1984

[54] PROCESS FOR PRODUCING α-OLEFIN POLYMERS

[75] Inventors: Akihiro Sato; Masami Tachibana; Toshihiro Uwai; Kenji Matsuda; Yoshiharu Higuchi, all of Chibaken, Japan

[73] Assignee: Chisso Corporation, Osaka, Japan

[21] Appl. No.: 403,105

[22] Filed: Jul. 29, 1982

[30] Foreign Application Priority Data

Aug. 4, 1981 [JP] Japan .................... 56-122190

[51] Int. Cl.³ .................... C08F 4/64; C08F 10/00
[52] U.S. Cl. .................... 526/114; 502/108; 526/116; 526/122; 526/127; 526/136; 526/137; 526/139; 526/140; 526/141; 526/142; 526/158; 526/159; 526/904; 525/268
[58] Field of Search .............. 526/114, 116, 122, 136, 526/139, 140, 141, 142, 137, 158, 159; 525/268

[56] References Cited

U.S. PATENT DOCUMENTS

| | | | |
|---|---|---|---|
| 4,177,160 | 12/1979 | Cecchin et al. | 526/142 |
| 4,235,747 | 11/1980 | Leung | 526/142 |
| 4,295,991 | 10/1981 | Wristers | 526/142 |
| 4,309,521 | 1/1982 | Sato et al. | 526/142 |
| 4,329,251 | 5/1982 | Sunada et al. | 526/142 |
| 4,330,433 | 5/1982 | Wristers | 526/142 |

*Primary Examiner*—Edward J. Smith
*Attorney, Agent, or Firm*—Fred Philpitt

[57] ABSTRACT

A process for producing highly crystalline α-olefin polymers of good particle form with high yield is provided, which comprises polymerizing α-olefin in the presence of a preactivated catalyst obtained by reacting a reaction product (I) of organoaluminum compound ($A_1$) with electron donor ($B_1$), with $TiCl_4$ to obtain a solid product (II); further reacting (II) with electron donor ($B_2$) and electron acceptor to obtain a solid product (III); during or/and after the reaction step for obtaining (II) or/and during or/and after the reaction step for obtaining (III), subjecting (II) or (III), to polymerization treatment with α-olefin; and combining the resulting final solid product with organo-aluminum compound ($A_2$) and a reaction product (G) of organoaluminum compound ($A_3$) with electron donor ($B_3$) to obtain a preactivated catalyst; and preferably, in this combination, further subjecting a part or the total of the catalyst to polymerization treatment with α-olefin in the presence of the final solid product and ($A_2$) to obtain another preactivated catalyst. The catalyst has a superior storage stability and heat stability.

20 Claims, No Drawings

PROCESS FOR PRODUCING α-OLEFIN POLYMERS

BACKGROUND OF THE INVENTION

1. Field of the Invention

This invention relates to a process for producing α-olefin polymers. More particularly it relates to a process for producing α-olefin polymers which are highly crystalline and have a good particulate form, under control of stereoregularity, with a good yield, by the use of a novel catalyst which is suitable for α-olefin polymerization, particularly gas phase polymerization and further, combinations of gas phase polymerization with slurry polymerization or bulk polymerization, as modifications of gas phase polymerization.

2. Description of the Prior Art

It has been well known that α-olefins are polymerized in the presence of the so-called Ziegler-Natta catalysts comprising a compound of transition metals of groups IV to VI of the Periodic Table and an organometallic compound of metals of groups I to III of the Table and including those modified by adding an electron donor, etc. Further, for producing highly crystalline polymers of propylene, butene-1, etc., titanium trichloride has been most widely used for the above compound of transition metals as a component of the catalysts. The titanium trichloride is classified into the following three kinds according to its preparation:

(1) a product obtained by reducing $TICL_4$ with hydrogen, followed by milling in a ball mill for activation (which is called titanium trichloride (HA));

(2) a product obtained by reducing $TiCl_4$ with metallic aluminum, followed by milling in a ball mill for activation, i.e. a compound expressed by the general formula $TiCl_3.1/3-AlCl_3$ (the so-called titanium trichloride (AA)); and (3) a product obtained by reducing $TiCl_4$ with an organoaluminum compound, followed by heat treatment.

However, these kinds of titanium trichloride are not fully satisfactory, and various improvements have been considered and attempted. As one of such improved processes, a process has been proposed wherein $TiCl_4$ is reduced with an organoaluminum compound to obtain a titanium trichloride which is then treated with an electron donor and $TiCl_4$ whereby the activity of the resulting catalyst is enhanced and also the amount of amorphous polymer formed is reduced (e.g. Japanese patent application laid-open No. Sho 47-34478/1972). However, such a process has a drawback that the catalyst is deficient in the heat stability.

Further another process has been proposed wherein $TiCl_4$ and an organoaluminum compound are respectively and separately mixed and reacted with a definite amount of a complex-forming agent (including electron donors) in advance, to obtain two separate reaction liquids which are then mixed and reacted together to prepare a solid catalyst component (Japanese patent application laid-open No. Sho 53-9296/1978). Such a process also has the same drawback as in the above Japanese patent application laid-open No. Sho 47-34478/1972 that the catalyst is deficient in the heat stability.

Still further, there have been proposed a process wherein a uniform liquid material consisting of an organoaluminum compound and an ether is added to $TiCl_4$ or this addition order is reversed to prepare a liquid material containing titanium trichloride (Japanese patent application laid-open No. Sho 52-115797/1977), and a process wherein the above liquid material is heated to a temperature of 150° C. or lower to deposit a finely particulate titanium trichloride (Japanese patent application laid-open No. Sho 52-47594/1977). However, such processes also have the same drawback as above the catalyst is deficient in the heat stability.

On the other hand, as to the phase of α-olefins in which they are polymerized in the presence of the Ziegler-Natta catalysts, slurry polymerization which is carried out in a solvent such as n-hexane (e.g. Japanese patent publication No. Sho 32-10596/1957), bulk polymerization which is carried out in a liquefied monomer such as liquefied propylene (e.g. Japanese patent publication Nos. Sho 36-6686/1961 and Sho 38-14041/1963), and gas phase polymerization which is carried out in a gaseous monomer such as gaseous propylene (e.g. Japanese patent publication Nos. Sho 39-14812/1964 and Sho 42-17487/1967) have been well known. Further a process of carrying out bulk polymerization followed by gas phase polymerization has also been known (e.g. Japanese patent publication No. Sho 49-14862/1974 and Japanese patent application laid-open No. Sho 51-135987/1976). Among these processes, gas phase polymerization is advantageous in that recovery and reuse of solvent used for polymerization as in the case of slurry polymerization are unnecessary; recovery and reuse of liquefied monomer used for polymerization as in the case of bulk polymerization are unnecessary; the recovery cost of solvent or monomer is small; equipments for producing α-olefins are simplified; etc. On the other hand, gas phase polymerization is disadvantageous in that since the monomer inside the reaction vessel is present in gas phase, the monomer concentration is lower than those in the case of slurry polymerization process or bulk polymerization process to make the reaction rate lower; hence, in order to increase the polymer yield per unit weight of catalyst, it is necessary to prolong the retention time or therefor to enlarge the reaction vessel, or in order to enhance the catalyst activity, it is necessary to use a modified trialkylaluminum whereby the stereoregularity of polymer is reduced. Further according to gas phase polymerization, uneven polymer particles are liable to form due to uneven catalyst particles. This is liable to cause agglomeration of polymer particles, clogging at the polymer discharge port of the polymerization vessel or on the transportation line or clogging due to fine particles accompanying unreacted α-olefin from the polymerization vessel to thereby make difficult a long term stabilized, continuous operation and make the quality dispersion greater.

As a process which does not have the above-mentioned drawbacks even in the case of gas phase polymerization, some of the present inventors have previously invented a process for producing α-olefins wherein a reaction product of an organoaluminum compound with an electron donor is reacted with $TiCl_4$ to obtain a solid material, which is then reacted with an electron donor and an electron acceptor to obtain a solid product, which is then combined with an organoaluminum compound an alpha-olefin and a reaction product (G) of an organoaluminum compound with an electron donor, to obtain a preactivated catalyst, and α-olefins are polymerized in the presence of the preactivated catalyst (Japanese patent application No. Sho 55-23785/1980; this application will hereinafter be referred to as "previous invention"). This Japanese application corresponds to U.S. Pat. No. 4,309,521.

The above previous invention of some of the present inventors has been characterized in that no polymer lump is formed in the gas phase polymerization; a long term stabilized operation is possible even in the case of gas phase polymerization; the polymer yield in the gas phase polymerization amounts to 7,000 to 12,000 g/g (solid product) and the amount of amorphous polymer formed is reduced; without increase in the amount of atactic polymer, it is possible to control the stereoregularity of polymer and it is also possible to control the toughness, particularly the bending modulus, of polymer; and the storage stability and the heat stability of catalyst are superior. On the other hand, such problems have been raised that when the catalyst is stored at a high temperature of 35° C. or higher, reduction in the catalyst activity is observed; a long term storage of the mixture catalyst obtained by adding an organoaluminum compound and a reaction product (G) of an α-olefin, an organoaluminum compound and an electron donor, to the solid product raises a problem; and in the case of a high temperature polymerization at 90° C. or higher, the resulting polymer has an inferior form and the percentage of amorphous polymer formed increases.

The present inventors have continued further studies for improvement, and as a result have found that if a solid product subjected to polymerization treatment with an α-olefin is used, it is possible to further improve the storage stability and the heat stability of the catalyst. Thus the present invention has been attained.

The object of the present invention is to provide a process for producing α-olefin polymers wherein a catalyst having a further improved storage stability and heat stability is used, whereby even when gas phase polymerization, slurry polymerization or bulk polymerization is carried out at a further higher temperature, the resulting polymer has a uniform particle size; the catalyst activity is higher; the percentage of amorphous polymer formed is lower; particularly the advantages of gas phase polymerization can be fully exhibited; and in addition, the stereoregularity of polymer can be easily controlled.

SUMMARY OF THE INVENTION

The present invention resides briefly in
a process for producing α-olefin polymers which comprises polymerizing an α-olefin in the presence of a preactivated catalyst obtained by
reacting a reaction product (I) of an organoaluminum compound ($A_1$) with an electron donor ($B_1$), with $TiCl_4$ (C) to obtain a solid product (II);
further reacting this solid product (II) with an electron donor ($B_2$) and an electron acceptor (E) to obtain a solid product (III);
during or/and after the reaction step for obtaining (II) or/and during or/and after the reaction step for obtaining (III), subjecting said solid product (II) or (III) to a polymerization treatment with an α-olefin; and
combining the resulting final solid product with an organoaluminum compound ($A_2$) and a reaction product (G) of an organoaluminum compound ($A_3$) with an electron donor ($B_3$) to obtain a preactivated catalyst; and preferably, in this combination,
further subjecting a part or the total of said preactivated catalyst to a polymerization treatment with an α-olefin in the presence of said final solid product and said organoaluminum compound ($A_2$) to obtain another preactivated catalyst.

The "polymerization treatment" referred to herein means that a small amount of an α-olefin is contacted with catalyst components under polymerizable conditions of the α-olefin to polymerize the α-olefin, and this polymerization treatment brings about a state where the catalyst components are coated with polymer.

DETAILED DESCRIPTION OF THE PREFERRED EMBODIMENTS

The preparation of the catalyst used in the present invention will be first described below.

The above-mentioned final solid product is prepared as follows:

First, an organoaluminum compound is reacted with an electron donor to obtain a reaction product (I), which is then reacted with $TiCl_4$ to obtain a solid product (II), which is further reacted with an electron donor and an electron acceptor to obtain a solid product (III), and during either one or both of the above second and third reaction steps, the solid product (II) or/and the solid product (III) are subjected to a polymerization treatment with an α-olefin to obtain a final solid product.

The reaction of an organoaluminum compound ($A_1$) with an electron donor ($B_1$) is carried out in solvent (D) at a temperature of −20° C. to 200° C., preferably −10° C. to 100° C., for a time of 30 seconds to 5 hours. The addition order of ($A_1$), ($B_1$) and (D) has no particular limitation, and suitable proportions of their amounts used are 0.1 to 8 mols, preferably 1 to 4 mols, of the electron donor and 0.5 to 5 l, preferably 0.5 to 2 l, of the solvent, each based on one mol of the organoaluminum compound. The solvent is preferred to be aliphatic hydrocarbons. Thus a reaction product (I) is obtained. This reaction product (I) can be subjected to the succeeding reaction without separating it i.e. in a liquid state where the reaction has been completed (this liquid state will hereinafter be referred to as reaction liquid (I)).

The method of subjecting the solid product (II) or (III) to a polymerization treatment with an α-olefin, during or/and after the reaction step for obtaining the solid product (II) or/and during or/and after the reaction step for obtaining the solid product (III), includes
(1) a method wherein an α-olefin is added at an optional time during the reaction of the reaction liquid (I) with $TiCl_4$ (C) to subject the solid product (II) to polymerization treatment;
(2) a method wherein after completion of the reaction of the reaction liquid (I) with $TiCl_4$, an α-olefin is added to subject the solid product (II) to polymerization treatment;
(3) a method wherein a solid product (II) obtained after filtering off or decantation and then washing or the solid product (II) subjected to polymerization treatment, obtained according to the above method (1) or (2), is combined with an organoaluminum compound, followed by adding an α-olefin to subject the combination to polymerization treatment;
(4) a method wherein during the step where the solid product (II) or the solid product (II) subjected to polymerization treatment, obtained in the above method (1) or (2), is reacted with an electron donor and an electron acceptor to obtain a solid product (III), an α-olefin is added to carry out polymerization treatment; and (5) a method wherein a solid product (III) obtained after filtering off or decantation and then washing is combined with an organoaluminum compound, followed by adding an α-olefin to subject the combination to polymerization treatment.

In the case of the polymerization treatment with an α-olefin according to the above method (1) or (2), an α-olefin is passed under the atmospheric pressure, or added so as to give a pressure of 10 kg/cm² or lower, at a reaction temperature of 30° to 90° C. for 5 minutes to 10 hours. As to the amount of α-olefin added, it is preferred to use 10 to 5,000 g of α-olefin per 100 g of the solid product (II) or the solid product (III) to be formed or formed and polymerize 0.05 to 100 g thereof. After completion of the polymerization treatment with α-olefin, unreacted olefin is purged and the resulting material is used for the succeeding step, in the suspension state in solvent, as it is, or in the form of solid matter obtained after drying the suspension.

In the case where the polymerization treatment with an α-olefin is applied to the solid product (II) or the solid product (III) obtained after filtering off or decantation and then washing, or the solid product (II) subjected to polymerization treatment, obtained according to the above method (1) or (2), it is preferred to add 10 to 2,000 ml of a solvent and 5 to 500 g of an organoaluminum compound to 100 g of the solid product (II) or the solid product (III), and add 10 to 5,000 g of an α-olefin under 0 to 10 kg/cm²G at a reaction temperature of 0° to 90° C. for 5 minutes to 10 hours to polymerize 0.05 to 100 g of the olefin. The solvent is preferably aliphatic hydrocarbons, and the organoaluminum compound may be either the same as or different from that used for the reaction liquid (I). After the polymerization treatment with an α-olefin, unreacted α-olefin is purged and the resulting material is filtered off or decanted and then washed with a solvent. Thereafter it is used at the succeeding step, in a state where it is suspended in a solvent or in the form of solid matter obtained after drying the suspension.

The reaction of the reaction product (I) with TiCl₄ is carried out at 0° to 200° C., preferably 10° to 90° C., for 5 minutes to 10 hours. Although solvent is preferably not used, aliphatic or aromatic hydrocarbons may be used. Mixing of (I), (C) and solvent may be carried out in any order, and it is preferred to complete mixing of the total amount within 5 hours. Even during the mixing, the reaction is carried out, and after mixing of the total amount, it is preferred to further continue the reaction within 5 hours. As to the respective amounts used for the reaction, the solvent is used in an amount of 0 to 3,000 ml per mol of TiCl₄, and the reaction product (I) is used in a ratio of the number of Al atoms in (I) to the number of Ti atoms in TiCl₄ (Al/Ti), of 0.05 to 10, preferably 0.06 to 0.3. It is also possible to add an α-olefin at an optional time during the reaction of (I) with (C) to carry out the polymerization treatment. After completion of the reaction, a solid product (II) obtained by filtering off or decanting a liquid portion, followed by repeating washing with a solvent, or a solid product (II) subjected to polymerization treatment with an α-olefin, may be used at the succeeding step in a state where the product (II) is suspended in a solvent, or in the form of solid matter obtained after drying the suspension. The former solid product (II) or the solid product (II) sub- jected to polymerization treatment may be further combined with an organoaluminum compound, followed by adding an α-olefin to the resulting combination to carry out polymerization treatment. After the polymerization treatment with an α-olefin, the resulting material is subjected to filtering off or decantation and then washing, and used at the succeeding step in a state where it is suspended in a solvent or in the form of solid matter obtained after drying the suspension.

The former solid product (II) or the solid product (II) subjected to polymerization treatment is then reacted with an electron donor (B₂) and an electron acceptor (E). Although this reaction can be carried out without any solvent, use of aliphatic hydrocarbons affords preferable results. Further, in this step, an α-olefin may be added to carry out polymerization treatment. The respective amounts used are 10 to 1,000 g, preferably 50 to 200 g, of (B₂), 10 to 1,000 g, preferably 20 to 500 g, of (E), 0 to 3,000 ml, preferably 100 to 1,000 ml, of the solvent, and 0 to 5,000 g of an α-olefin, each based on 100 g of the solid product (II). These four or five substances are preferably mixed at −10° C. to 40° C. for 30 seconds to 60 minutes and reacted at 40° to 200° C., preferably 50° to 100° C. for 30 seconds to 5 hours. The mixing order of the solid product (II), (B₂), (E), the solvent and the α-olefin has no particular limitation. (B₂) and (E) may be reacted with one another in advance of mixing them with the former solid product (II) or the solid product (II) subjected to polymerization treatment, and in this case, (B₂) is reacted with (E) at 10° to 100° C. for 30 minutes to 2 hours, followed by cooling down to 40° C. or lower for use. After completion of the reaction of the solid product (II), (B₂) and (E), a liquid portion is separated and removed by filtering off or decantation, followed by repeating washing with a solvent to obtain a solid product (III). This solid product (III) may be further combined with an organoaluminum compound, followed by adding an α-olefin to carry out polymerization treatment. After the polymerization treatment with an α-olefin, the resulting material is subjected to filtering off or decantation, followed by washing to obtain a final solid product. This final solid product is used at the succeeding step in a state where it is suspended in a solvent, or in the form of solid matter obtained after drying the suspension. In the case where the solid product (III) is not subjected to the polymerization treatment with an α-olefin, the solid product (III) corresponds to the final solid product.

The final solid product thus obtained is then combined with an organoaluminum compound (A₂) and a reaction product (G) of an organoaluminum compound (A₃) with an electron donor (B₃), or preferably an α-olefin is further added to the resulting combination, to obtain a preactivated catalyst. By adequately selecting the reaction product (G) at the time of the combination, it is possible to control the stereoregularity of the resulting polymer. This preactivation will be described later in detail.

The organoaluminum compounds employed in the present invention are expressed by the general formula $AlR_nR'_nX_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and as concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methyl-pentylaluminum, tri-n-octylaluminum, tri-n-decylaluminum, etc., dialkylaluminum monohalides such aas diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride; and alkylaluminum halides such as methylaluminum sesquichloride, ethylaluminum sesquichloride, ethylaluminum dichloride, i-butylaluminum dichloride, etc. are mentioned. Besides, alkoxyalkylaluminums such as monoethoxydiethylaluminum, diethoxymonoethylaluminum, etc. may be also employed. These organoaluminums may be employed in admixture of two or more kinds. The organoaluminum compound (A1) for obtaining the solid product (I), the organoaluminum compound (A2) to be combined with the final solid product and (A3) for obtaining the reaction product (G) may be the same as or different from one another.

As for the electron donors employed in the present invention, various kinds are illustrated below, but it is preferable that electron donors composed mainly of ethers be employed as (B$_1$) and (B$_2$), and other electron donors be employed together with ethers. As for the electron donors employed, organic compounds containing at least one atom of oxygen, nitrogen, sulfur and phosphorus, such as ethers, alcohols, esters, aldehydes, fatty acids, aromatic acids, ketones, nitriles, amines, amides, urea, thiourea, isocyanates, azo compounds, phosphines, phosphites, phosphinites, H$_2$S, thioethers, thioalcohols, etc. are mentioned. As for concrete examples, ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; alcohols such as methanol, ethanol, propanol, butanol, pentanol, hexanol, octanol; phenols such as phenol, cresol, xylenol, ethylphenol, naphthol; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, 2,4,6-trimethylpyridine, N,N,N′,N′-tetramethylhexaethylenediamine, aniline, dimethylaniline; amides such as formamide, hexamethyl phosphoric acid triamide, N,N,N′,N′,N″-pentamethyl-N′-β-dimethylaminoethyl phosphoric acid triamide, octamethyl-pyrophosphoroamide; ureas such as N,N,N′,N′-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned. These electron donors may be employed in admixture. The electron donor (B$_1$) for obtaining the reaction product (I), (B$_2$) to be reacted with the solid product (II) or the solid product (II) subjected to polymerization treatment and (B$_3$) for obtaining the reaction product (G) may be the same as or different from one another.

The electron acceptors (E) employed in the present invention are represented by halides of elements of III Group to VI group of the Periodic Table. As concrete examples, anhydrous AlCl$_3$, organoaluminum compounds expressed by the general formula AlR$_n$X$_{3-n}$ (0<n<2), SiCl$_4$, SnCl$_2$, SnCl$_4$, TiCl$_4$, ZrCl$_4$, PCl$_3$, PCl$_5$, VCl$_4$, SbCl$_5$, etc. are mentioned. They may be employed in admixture. TiCl$_4$ is most preferable.

As for the solvent, the following ones are employed: As aliphatic hydrocarbons, n-pentane, n-hexane, n-heptane, n-octane, i-octane, etc. are mentioned. Further, in place of the aliphatic hydrocarbons or together therewith, halogenated hydrocarbons such as carbon tetrachloride, chloroform, dichloroethylene, trichloroethylene, tetrachloroethylene, etc. may be also employed. As for aromatic compounds, aromatic hydrocarbons such as naphthalene, and as their derivatives, alkyl substitutes such as mesitylene, durene, ethylbenzene, isopropylbenzene, 2-ethylnaphthalene, 1-phenylnaphthalene, etc., and halides such as monochloro-benzene, chlorotoluene, chloroxylene, dichlorobenzene, bromobenzene, etc. are mentioned.

As for α-olefins employed for the polymerization treatment, straight chain monoolefins such as ethylene, propylene, butene-1, pentene-1, hexene-1, heptene-1, etc., branched chain monoolefins such as 4-methyl-pentene-1, 2-methyl-pentene-1,3-methyl-butene-1, etc. are mentioned. Styren may also be used. These α-olefins may be same as or different from those used for preliminary activation or those used for regular polymerization, and may be employed in admixture.

Next, a method of combining the final solid product, an organoaluminum compound (A$_2$) and the reaction product (G) of an organoaluminum compound (A$_3$) with an electron donor (B$_3$) to prepare the catalyst, and a preferable method of further carrying out preactivation with an α-olefin to prepare the catalyst, will be described below in detail.

The organoaluminum compounds (A$_2$) and (A$_3$) constituting the catalyst used in the present invention are not required to be the same as (A$_1$) used for forming the reaction liquid (I), but (A$_1$), (A$_2$) and (A$_3$) may be the same as or different from one another. The most preferable organoaluminum compounds are dialkylaluminum monohalides as (A$_1$) and (A$_2$) and trialkylaluminums as (A$_3$).

The electron donor (B$_3$) employed for preparing the reaction product (G) is the same as those described in the reaction for obtaining the final solid product, but is not necessary to be the same as that employed for obtaining the final solid product. The reaction product (G) is usually obtained by reacting 1 mol of an organoaluminum compound with 0.01 to 5 mols of an electron donor in the presence of a solvent such as n-hexane, n-heptane, in an amount of 10 to 5,000 ml based on 1 g of the organo-aluminum and based on 1 g of the electron donor, at $-30°$ to $100°$ C. for 10 minutes to 10 hours. Usually, the reaction is carried out by dropwise adding the electron donor diluted with the solvent to the organoaluminum compound diluted with the solvent.

In the case where the final solid product is combined with the organoaluminum compound ($A_2$) and the reaction product (G) to obtain the catalyst, the organoaluminum compound ($A_2$) is used in an amount of 0.1 to 500 g, preferably 0.5 to 500 g and the reaction product (G), in an amount of 0.05 to 10 g, each per g of the final solid product, and they may be combined together in any order to obtain the catalyst. For example, the order of combination may be either the one of ($A_2$), the final solid product and (G) or the one of ($A_2$), (G) and the final solid product.

A further preferred method of the present invention is a method of adding an α-olefin to the catalyst components to subject a part or the whole of the catalyst components to polymerization treatment for preactivation. A method of combining the final solid product, the organoaluminum compound ($A_2$), the α-olefin (F) and the reaction product (G) for preactivation will be described below in detail.

The preactivation may be carried out by subjecting a part or the whole of the catalyst components of 1 g of the final solid product, 0.1 to 500 g, preferably 0.5 to 50 g of an organoaluminum compound ($A_2$) and 0.05 to 10 g of the reaction product (G), to polymerization treatment at least in the presence of the final solid product and the organoaluminum compound ($A_2$), with 0.01 to 5000 g, preferably 0.05 to 3000 g of an α-olefin. As for the conditions of the polymerization treatment, it is preferable that the temperature be in the range of 0° to 100° C., preferably 10° to 70° C., the time be in the range of one minute to 20 hours, and the α-olefin be polymerized in an amount of 0.01 to 2,000 g, preferably 0.05 to 200 g per g of the final solid product. In the polymerization treatment, 10 l or less of hydrogen may be made present. In the preactivation, 50 l or less of a solvent may be employed. The solvent may be hydrocarbon solvents such as propane, butane, n-pentane, n-hexane, n-heptane, benzene, toluene, etc., and the preactivation may be carried out in a liquid α-olefin such as liquefied propylene, liquefied butene-1, etc., or in gaseous ethylene or propylene.

In advance of the preactivation, polymer particles obtained by slurry, bulk or gas phase polymerization may be made coexistent. Such polymer may be the same as or different from α-olefin polymers as the object of polymerizatin. The amount of such polymer capable of being made coexistent may be in the range of 0 to 5,000 g per g of the final solid product.

The solvent or α-olefin employed in the preactivation may be removed by distilling off under reduced pressure, filtration or the like means, midway during the preliminary activation or after completion of the activation. Further, for suspending the solid product in a solvent of 80 l or less per g of the solid product, the solvent may be added.

For the preactivation, there are various methods.

As for the main embodiments therefor, the following are illustrated:

(1) a method wherein final solid product is combined with organoaluminum compound ($A_2$), and α-olefin (F) is added to carry out polymerization treatment, followed by adding reaction product (G);

(2) a method wherein final solid product is combined with ($A_2$) in the presence of (F) to carry out polymerization treatment with (F), followed by adding (G);

(3) a method wherein final solid product is combined with ($A_2$), and (G) is added, followed by polymerization treatment with (F); and (4) a method wherein, after the procedure of the above (3), (G) is further added.

With regard to the methods (1) and (2) of preactivation, the following concrete methods are further illustrated:

(1-1) a method wherein final solid product is combined with ($A_2$) and the resulting combination is subjected to polymerization treatment with (F) in vapor phase or in liquefied α-olefin or in a solvent, followed by removing unreacted (F) or unreacted (F) and solvent and thereafter adding (G);

(1-2) a method wherein (G) is added without removing unreacted (F) or unreacted (F) and solvent, in (1-1);

(1-3) a method wherein (G) is added and thereafter unreacted (F) or unreacted (F) and solvent are removed, in (1-2);

(1-4) a method according to (1-1)∼(1-3) wherein α-olefin polymer obtained in advance is added;

(1-5) a method according to (1-1)∼(1-4) wherein after preactivation, solvent or unreacted (F) and solvent are removed to obtain a catalyst in the form of powder;

(2-1) a method wherein ($A_2$) is combined with final solid product in the presence of α-olefin dissolved in a solvent or liquefied α-olefin or α-olefin gas, to carry out polymerization treatment with α-olefin, followed by adding (G);

(2-2) a method wherein (2-1) is carried out in the presence of α-olefin polymer obtained in advance; and (2-3) a method wherein after preactivation, unreacted (F) and solvent are removed under reduced pressure to obtain a catalyst in the form of powder.

In the methods (1) and (2), it is possible that a component obtained by reacting final solid product and ($A_2$) with (F) is not mixed with (G) at the time of catalyst preparation, but they are mixed together just before polymerization. Further, in the methods (1)∼(4), it is possible to employ hydrogen together with (F). Whether the catalyst is prepared in the form of slurry or in the form of powder affords no essential difference.

The catalyst obtained by combining the final solid product, ($A_2$) and (G) as described above or the preactivated catalyst obtained by further reacting it with an α-olefin is employed for producing α-olefin polymers. The polymerization may be carried out either by slurry polymerization in a hydrocarbon solvent or by bulk polymerization in liquefied α-olefin monomer, but, in the present invention, since the catalyst has a high activity, gas phase polymerization of α-olefins exhibits a particularly notable effectiveness, and slurry of bulk polymerization followed by gas phase polymerization as a modification of gas phase polymerization also exhibits a desirable effectiveness.

The gas phase polymerization of α-olefins may be carried out not only in the absence of solvent such as n-hexane, n-heptane, but also in a state where 0 to 500 g of solvent per Kg of α-olefin polymer is contained. Further it may be carried out either by continuous polymerization or batch polymerization. Furthermore, it may be carried out in fluidized bed manner, or in a fluidized manner by way of agitating elements, or in stirring manner by way of vertical or horizontal type paddle.

As for the method of slurry or bulk polymerization followed by gas phase polymerization, of α-olefins, the following are illustrated: for example, in the case of batch polymerization, a method wherein α-olefin is polymerized in a solvent or liquefied α-olefin monomer, and thereafter the solvent or α-olefin monomer is removed so that it is contained in an amount of 500 g or less per Kg of polymer particles, followed by polymerizing α-olefin- in vapor phase, and a method wherein polymerization of α-olefin is continued without removing the solvent or liquefied α-olefin and moves into gas phase polymerization without adding any operation since the solvent or liquefied α-olefin is absorbed in the resulting polymer. A plural step polymerization consisting of a combination of slurry or bulk polymerization with gas phase polymerization exhibits a desirable result particularly in the case of continuous polymerization. This plural step polymerization may be carried out as follows: In the first step, slurry or bulk polymerization is carried out wherein the polymerization is continued so as to give a slurry concentration [(polymer (Kg))/(polymer (Kg)+solvent or liquefied α-olefin (Kg))×100%] of 70% or higher, or the polymerization is carried out until a slurry concentration reaches 30 to 50%, and thereafter solvent or liquefied α-olefin is removed so as to give a slurry concentration of 70% or higher; and in the second step, α-olefin is subjected to vapor phase polymerization. In this method, the catalyst is added at the time of slurry or bulk polymerization of the first step, and in the gas phase polymerization successively carried out, the catalyst of the first step may be sufficiently employed as it is, but a fresh catalyst may be also added in the second step. As for the proportion of the weight of polymer formed by slurry or bulk polymerization and that of polymer formed by gas phase polymerization, it is preferable that the proportion be in the range of 0.1 to 100 parts by weight of polymer of gas phase polymerization based on one part of polymer of slurry or bulk polymerization.

As for the polymerization conditions of α-olefins, any of slurry polymerization, bulk polymerization and gas phase polymerization may be carried out at a polymerization temperature of room temperature (20° C.) to 200° C., under a polymerization pressure of the atmospheric pressure (0 kg/cm$^2$G) to 50 kg/cm$^2$G and usually for 5 minutes to 20 hours. In the polymerization, addition of a suitable amount of hydrogen for adjustment of molecular weight, and the like means are carried out as in conventional manner.

As for the α-olefins employed in the polymerization of the present invention, straight chain monoolefins such as ethylene, propylene, butene-1, hexene-1, octene-1, etc., branched chain monoolefins such as 4-methyl-pentane-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The main effectiveness of the present invention consists in that polymerization at high temperatures is possible by use of the catalyst having an improved storage stability and heat stability, and yet it is possible to readily control the stereoregularity of the resulting polymer with a small amount of amorphous polymer formed.

The effectiveness of the present invention will be further described in more detail.

The first effectiveness of the present invention is that the high heat-stability of the catalyst has enabled the polymerization of α-olefins to be effected at high temperatures. However, polymerization at high temperatures above 90° C. often has degraded the powder form and also has increased the percentage of amorphous polymer formed, whereas according to the present invention, even when polymerization is carried out above 90° C., the resulting polymer has a uniform powder form and a low percentage of amorphous polymer formed. Due to the fact that such a high temperature polymerization is possible, a large difference between the polymerization temperature and the temperature of cooling water could have been afforded to increase the capacity of heat removal and also the production capacity per a polymerization vessel.

The second effectiveness of the present invention is that it is possible to control the stereoregularity of polymer without increasing the amount of atactic polymer as n-hexane-soluble. For example, in the case of polypropylene, it is possible to optionally control the stereoregularity of homopolymer in the range of 0.88 to 0.96 in terms of absorbancy ratio of those at 995 cm$^{-1}$ to those at 974 cm$^{-1}$, measured by infrared absorption method (which ratio will be hereinafter expressed by IR-$\tau$), and also the stereoregularity of copolymer in the range of 0.83 to 0.95, without increase in the amount of atactic polymer. Heretofore, when the stereoregularity of homopolymer has been reduced, or when copolymers have been produced, for improving the physical properties of molded product of polymer such as rigidity, impact strength, heat seal temperature, etc., the amount of atactic polymer has increased. Whereas according to the present invention, it has become possible to omit the removing step of atactic polymer and yet optionally control the stereoregularity of polymer depending on the application fields of polymer, in the production of polymer.

The third effectiveness of the present invention is that storage stability of the final solid product and the catalyst has been further improved. For example, even when the final solid product is allowed to stand at a high temperature of about 40° C. for about 4 months, no reduction in the polymerization activity occurs; hence no particular storing equipment for storing the final solid product is necessary, and even when the final solid product is combined with an organoaluminum compound and the reaction product (G), and thereafter the resulting combination is allowed to stand in a high concentration of the final solid product of 1.0% or higher, at 40° C. or higher, for about one week till polymerization is initiated, no reduction in the polymerization activity occurs; fine pulverization of catalyst brought about by agitation in the catalyst tank hardly occurs; and the form of polymer particles is not degraded.

The fourth effectiveness of the present invention is that since the resulting catalyst has a very high activity, a high polymer yield is obtained, of course, in the slurry or bulk polymerization; further, even in the gas phase polymerization where the monomer concentration is relatively low, the polymer yield per g of the final solid product amounts to 9,000 to 15,000 g (polymer).

The fifth effectiveness of the present invention is that since the polymer is obtained with a high yield, even if the amounts of alcohol, alkylene oxide, steam, etc. employed for killing the catalyst after production of α-olefin polymers or purifying the polymer are further reduced, polymer is not colored and has a yellowness index (YI) as low as 0 to 2.0; further, evolution of corrosive gas having a bed effect such as degradation of physical properties of polymer or rusting of mold at the time of molding of polymer does not occur: for example, even in the case where polymer is heated at 200° C., evolution of acidic gas changing the color of a testing paper of Congo Red is not observed.

The sixth effectiveness of the present invention is that the percentage of amorphous polymer formed at the time of production of α-olefin polymers, is reduced, and also such effectiveness is great particularly at the time of production of copolymer. For example, in the production of propylene polymer, the amount of isotactic polypropylene as n-hexane-insoluble (20° C.) reaches 98 to 99.8% in terms of isotactic index, and that of atactic polypropylene as n-hexane-soluble is only 0.2 to 2% in terms of atactic index. Thus, even when atactic polymer is not removed, disadvantages such as degradation of physical properties of polymer such as rigidity, heat stability, etc. are overcome, whereby removing step of atactic polymer can be omitted, resulting in simplification of production process of polymer.

The seventh effectiveness of the present invention is that polymer particles having a good form are obtained and also the average particle size is small, that is, 90 to 99% of polymer is in a proportion of 32 mesh pass to 60 mesh on. The form of particles is close to sphere; the amounts of large particles and fine particles are reduced; and the particle size distribution is narrow. Further, the bulk density (BD) of polymer is in the range of 0.45 to 0.52 and a small area of storage tank per unit weight of polymer may be sufficient; hence it is possible to make compact the plant for producing polymer; neither clogging trouble brought by cohesion of polymer particles nor transporting trouble brought about by fine particles occurs; hence particularly in the gas phase polymerization, it is possible to carry out a long term stabilized, continuous operation, since the amount of fine particles entrained in the unreacted α-olefin gas discharged from the polymerization vessel is reduced.

EXAMPLE 1

(1) Preparation of final solid product n-Hexane (60 ml), diethylaluminum monochloride (DEAC) (0.05 mol) and diisoamyl ether (0.12 ml) were mixed together at 25° C. for one minute and then reacted at the same temperature for 5 minutes, to obtain a reaction liquid (I) (molar ratio of diisoamyl ether/DEAC:2.4). TiCl$_4$ (0.4 mol) was introduced into a reactor purged with nitrogen gas and heated to 35° C., and thereto was dropwise added the total amount of the above-mentioned reaction liquid (I) for 180 minutes, followed by maintaining the resulting material at the same temperature for 60 minutes, elevating the temperature to 80° C., carrying out further reaction for one hour to form a solid product (II), cooling down to 50° C., adding propylene (2.85 g) and carrying out polymerization treatment at 50° C. for 2 hours. After the treatment, the liquid was heated to 70° C. and the supernatant was removed, followed by 4 times repeating a procedure of adding 400 ml of n-hexane and removing the supernatant by decantation to obtain a solid product (II) subjected to the polymerization treatment (20.4 g i.e. solid product (II) (19.0 g) plus polymer (1.4 g)). The total amount of this (II) was suspended in 25 ml of n-hexane, and to the resulting suspension were added diisoamyl ether (16 g) and TiCl$_4$ (35 g) at 20° C. for about one minute, followed by reaction at 70° C. for one hour. After completion of the reaction, the resulting material was cooled down to room temperature (20° C.) and the supernatant was removed by decantation, followed by 5 times repeating a procedure of adding 400 ml of n-hexane, stirring for 10 minutes, still standing and removing the supernatant, and drying under reduced pressure, to obtain a solid product (III) (final solid product).

(2) Preparation of preactivated catalyst

A 2 l capacity stainless steel reactor equipped with slant blades was purged by nitrogen gas, and into this reactor were added n-hexane (20 ml), diethylaluminum monochloride (414 mg) and the final solid product (22 mg) at room temperature. Reaction was then carried out at 40° C. under a partial pressure of propylene of 2 kg/cm$^2$G for 10 minutes (reacted propylene per g of final solid product: 16.3 g), followed by purging unreacted propylene and then adding a reaction product (G) obtained by reacting triethylaluminum (23 mg) with methyl p-toluylate (30.3 mg) in n-hexane (20 ml) at 25° C. for 30 minutes, to obtain a preactivated catalyst.

(3) Polymerization of propylene

Into the reactor containing the catalyst after completion of the preactivation was introduced 150 ml of hydrogen, and gas phase polymerization was carried out under a partial pressure of propylene of 22 Kg/cm$^2$G, at a polymerization temperature of 80° C. for 2 hours. After completion of the reaction, 3 g of methanol was introduced and killing reaction was carried out at 70° C. for 30 minutes, followed by cooling down to room temperature (20° C.) and drying the resulting polymer, to obtain 286 g of polymer. The polymer yield per g of final soid product was 13,000 g, the isotactic index (n-hexane-insoluble at 20° C. (%)), 99.2, BD of polymer, 0.50, and the polymer particles had a form close to sphere, 99.0% thereof having sizes between 32 meshes and 60 meshes, and 150 meshes-pass being 0.1% or less. No lump was observed.

No coloration of polymer was observed and yellowness index (YI) was 0.5. Further, in order to observe the extent of corrosiveness of polymer brought about by the extent of heat stability of catalyst after killing, polymer was heated to a definite temperature and whether acidic gas is easily or difficultly evolved was observed through the presence or absence of color change of Congo Red (according to JIS K-6723). As a result, no color change was observed.

The polymer was annealed at 135° C. for 120 minutes according to J. P. Luongo's method (Journal of Applied polymer Science, 3, 302 (1960)) to give an IR-τ of 0.94.

EXAMPLE 2

The steps (1) and (2) of Example 1 were repeated to obtain a preactivated catalyst. n-Hexane (1,500 ml) and hydrogen (200 ml) were then introduced and slurry polymerization was carried out under a partial pressure of propylene of 10 kg/cm$^2$G at 70° C. for 4 hours. After completion of the polymerization, n-hexane was removed by steam stripping to obtain a polymer.

EXAMPLE 3

Example 2 was repeated except that propylene slurry polymerization was carried out at 92° C. in place of 70° C. The particle form, bulk density and isotactic index of the resulting polymer were almost unchanged from those of Example 2.

COMPARATIVE EXAMPLE 1

Propylene polymerization was carried out as in Example 3 except that the reaction product (G) was not used. The resulting polymer swelled in n-hexane.

COMPARATIVE EXAMPLE 2

Diisoamyl ether and $TiCl_4$ were reacted with the solid product (II) as in Example 1 but without subjecting the solid product (II) to polymerization treatment with propylene, to obtain a final solid product, followed by propylene polymerization as in Example 3, but at 92° C. The BD and isotactic index of the resulting polymer both lowered.

COMPARATIVE EXAMPLE 3

Propylene polymerization was carried out using the solid product (II) obtained in Example 1, in the same manner as in Example 3, but at 92° C. The resulting polymer swelled in n-hexane.

COMPARATIVE EXAMPLE 4

Propylene polymerization was carried out using the solid product (II) subjected to polymerization treatment, obtained in Example 1, in the same manner as in Example 3 but at 92° C. The resulting polymer swelled in n-hexane.

EXAMPLE 4

The final solid product obtained in Example 1 was preserved at 40° C. for 4 months. Propylene polymerization was carried out as in the steps (2) and (3) of Example 1.

COMPARATIVE EXAMPLE 5

The solid product (II) obtained in Example 1 was preserved at 40° C. for 4 hours as in Example 4. Propylene polymerization was then carried out.

COMPARATIVE EXAMPLE 6

The solid product (II) subjected to polymerization treatment, obtained in Example 1, was preserved at 40° C. for 4 months as in Example 4. Propylene polymerization was then carried out.

COMPARATIVE EXAMPLE 7

Propylene polymerization was carried out as in Example 4 except that the solid product (II), without being subjected to polymerization treatment, was reacted with diisoamyl ether and $TiCl_4$ to obtain a final solid product.

COMPARATIVE EXAMPLE 8

Polymerization was carried out without adding the reaction product (G) in Example 4.

EXAMPLE 5

A preactivated catalyst was prepared as in Example 2 except that methyl p-toluylate (15 mg) was used in the preparation of the reaction product (G). Using this catalyst, propylene polymerization was carried out.

EXAMPLE 6

A preactivated catalyst was prepared as in Example 2 except that methyl p-toluylate (7.5 mg) was used in the preparation of the reaction product (G). Using this catalyst, propylene polymerization was carried out.

EXAMPLE 7

A preactivated catalyst was prepared as in Example 2 except that methyl p-toluylate (4.7 mg) was used in the preparation of the reaction product (G). Using this catalyst, propylene polymerization was carried out.

EXAMPLE 8

A preactivated catalyst was prepared as in Example 2 except that methyl p-toluylate (60 mg) was used in the preparation of the reaction product (G). Using this catalyst, propylene polymerization was carried out.

COMPARATIVE EXAMPLE 9

A preactivated catalyst was prepared as in Example 2 except that triethylaluminum (23 mg) was used in place of the reaction product (G), in the preparation of the catalyst. Using the catalyst, propylene polymerization was carried out. The amount of atactic polymer increased notably.

COMPARATIVE EXAMPLES 10 AND 11

A preactivated catalyst was prepared as in Example 2 except that methyl p-toluylate (30.3 g) (Comparative example 10) or (7.5 mg) (Comparative example 11) was used in place of the reaction product (G). Using the catalyst, propylene polymerization was carried out. The value of IR-$\tau$ was unchanged.

EXAMPLE 9

A preactivated catalyst was prepared as in Example 1 except that triisobutylaluminum (50 mg) and ethyl benzoate (38 mg) were used in the preparation of the reaction product (G). Using the catalyst, propylene polymerization was carried out.

EXAMPLE 10

A preactivated catalyst was prepared as in Example 1 except that tri-n-butylaluminum (40 mg) and ethyl p-anisate (55 mg) were used in the preparation of the reaction product (G). Using the catalyst, propylene polymerization was carried out.

EXAMPLE 11 n-Heptane (40 ml), diethylaluminum monochloride (0.05 mol), diisoamyl ether (0.09 mol) and di-n-butyl ether (0.05 mol) were reacted at 18° C. for 30 minutes to obtain a reaction liquid, which was dropwise added to $TiCl_4$ (0.275 mol) at 40° C. over 300 minutes, followed by reacting the mixture at the same temperature as the above, for 1.5 hour, raising the temperature to 65° C., further reacting the mixture for one hour, removing the supernatant and 6 times repeating a procedure of adding n-hexane (200 ml) and removing the supernatant by decantation to obtain a solid product (II) (18 g), which was then suspended in n-hexane (500 ml), followed by adding diethylaluminum monochloride (2 g) and adding propylene (1 g) at 60° C. for 1 hour for reaction to obtain a solid product (II) subjected to polymerization treatment (amount of propylene reacted: 0.3 g). After the reaction, the supernatant was removed, followed by twice repeating a procedure of adding n-hexane (300 ml) and removing the supernatant by decantation. The solid product (II) subjected to polymerization treatment (18.3 g) was then suspended in n-hexane (40 ml), followed by adding TiCl$_4$ (18 g) and n-butyl ether (18 g) and reacting the mixture at 60° C. for 3 hours. After the reaction, the supernatant was removed by decantation, followed by three times repeating a procedure of adding n-hexane (200 ml), stirring for 5 minutes, allowing the mixture to stand and removing the supernatant, and then drying the resulting material under reduced pressure to obtain a final solid product. Using this product, propylene polymerization was carried out as in the steps (2) and (3) of Example 1.

EXAMPLE 12 n-Octane (80 ml), diisopropylaluminum monochloride (0.05 mol) and di-n-octyl ether (0.11 mol) were reacted at 35° C. for 4 hours to obtain a reaction liquid, which was dropwise added to TiCl$_4$ (0.25 mol) at 31° C. over 120 minutes, followed by reacting the mixture at 40° C. for 30 minutes, raising the temperature to 85° C., further reacting the mixture for 30 minutes, adding propylene (20 g) at the same temperature as the above, reacting the mixture for 30 minutes, removing the liquid by filtering off, twice repeating a procedure of adding n-octane (300 ml), stirring the mixture for 5 minutes and filtering off, to obtain a solid product (II) subjected to polymerization treatment (solid product (II): 17.5 g) (amount of propylene reacted: 0.1 g). To this solid product subjected to polymerization treatment were added n-octane (40 ml), diisoamyl ether (22 g) and TiCl$_4$ (14 g), followed by reacting the mixture at 85° C. for 30 minutes, filtering off, 4 times repeating a procedure of adding n-pentane (100 ml), stirring for 10 minutes and filtering off, and drying to obtain a solid product (III). This product (17 g) was then suspended in n-pentane (100 ml), followed by adding diethylaluminum monochloride (2.4 g), adding propylene (3 g) and reacting the mixture at 45° C. for 2 hours (amount of propylene reacted: 0.6 g). After the reaction, filtering off, washing and drying were carried out to obtain a final solid product, from which a preactivated catalyst was prepared as in Example 1. Using this catalyst, propylene polymerization was carried out.

EXAMPLE 13

A final solid product was prepared as in Example 12 except that di-n-butylaluminum monochloride (0.04 mol) was used in place of diisopropylaluminum monochloride (0.05 mol) to obtain a reaction liquid (I) which was dropwise added to TiCl$_4$ at 45° C. Using the final solid product, propylene polymerization was carried out.

EXAMPLE 14 n-Hexane (60 ml), diethylaluminum monochloride (DEAC) (0.05 mol) and diisoamyl ether (0.12 mol) were mixed at 25° C. for one minute and the mixture was then reacted at the same temperature as the above for 5 minutes to obtain a reaction liquid (I) (the molar ratio of diisoamyl ether to DEAC: 2.4). TiCl$_4$ (0.5 mol) was placed in a reactor purged with nitrogen gas and heated to 35° C., followed by dropwise adding to the mixture the total amount of the above reaction liquid (I) over 120 minutes, maintaining the temperature at the same temperature as the above for 30 minutes, raising the temperature to 75° C., further reacting for one hour, cooling down to room temperature, removing the supernatant and 4 times repeating a procedure of adding n-hexane (400 ml) and removing the supernatant by decantation to obtain a solid product (II) (19 g). The total amount of this (II) was suspended in n-hexane (300 ml), followed by adding diisoamyl ether (16 g) and TiCl$_4$ (35 g) at room temperature (20° C.) over about one minute and reacting the mixture at 65° C. for one hour. After the reaction, the liquid was cooled down to room temperature (20° C.), followed by removing the supernatant by decantation, 5 times repeating a procedure of adding n-hexane (400 ml), stirring for 10 minutes, allowing the mixture to still stand and removing the supernatant and drying under reduced pressure to obtain a solid product (III). A portion (10 g) of this solid product (III) was suspended in n-hexane (200 ml), followed by adding diethylaluminum monochloride (0.7 g), further adding propylene (2 g), reacting the mixture at 25° C. for 10 minutes, filtering off when 1 g of propylene reacted, twice washing with n-hexane (200 ml) and drying under reduced pressure to obtain a final solid product from which a preactivated catalyst was obtained as in Example 1. Using this catalyst, propylene polymerization was carried out.

EXAMPLE 15

Example 1 was repeated except that diisoamyl ether (22 g), TiCl$_4$ (20 g) and silicon tetrachloride (18 g) were added to the solid product (II) subjected to polymerization treatment to obtain a final solid product. Using this product, propylene polymerization was carried out.

EXAMPLE 16

Example 1 was repeated except that di-n-pentyl ether (28 g) and anhydrous aluminum trichloride (5 g) were added to n-heptane (100 ml), followed by reacting the mixture on heating at 80° C. for 2 hours to obtain a solution to which a solid product (II) subjected to polymerization treatment (20.4 g), as in Example 1, was added, followed by reacting the mixture at 80° C. for 2 hours to obtain a final solid product. Using this product, propylene polymerization was carried out.

EXAMPLE 17

Example 11 was repeated except that TiCl$_4$ (35 g), diisoamyl ether (12.0 g) and di-n-butyl ether (6 g) were added to the solid product (II) subjected to polymerization treatment (18.3 g), to obtain a final solid product. Using this product, propylene polymerization was carried out.

EXAMPLE 18

Triisobutylaluminum (0.03 mol) was reacted with di-n-dodecyl ether (0.07 mol) in n-hexane (100 ml) at 20° C. for 40 minutes to obtain a reaction liquid, which was then dropwise added to TiCl$_4$ (0.18 mol) at 20° C. over 2 hours, followed by adding propylene (4 g), reacting the mixture at 30° C. for 30 minutes and further at 50° C. for 60 minutes, removing the liquid portion by filtering off and washing with n-hexane to obtain a solid product (II) subjected to polymerization treatment (23.8 g) (amount of propylene reacted: 0.8 g). To this product were added n-heptane (50 ml), di-n-butyl ether (21 g) and TiCl$_4$ (40 g), followed by reacting the mixture at 50° C. for 140 minutes, filtering off, washing with n-hexane and drying to obtain a final solid product. Using this product, propylene polymerization was carried out as in Example 1.

EXAMPLE 19

Triethylaluminum (0.07 mol) was reacted with diisoamyl ether (0.18 mol) in n-hexane (45 ml) at 40° C. for 4 hours to obtain a reaction liquid, which was then dropwise added to $TiCl_4$ (0.84 mol) at 32° C. for 4 hours, followed by maintaining the temperature at 35° C. for one hour, adding propylene (10 g), raising the temperature up to 78° C., reacting the mixture at this temperature for 2 hours, filtering off, washing with n-hexane and drying to obtain a solid product (II) subjected to polymerization treatment (24 g) (amount of propylene reacted: 1.0 g). This product was added to a reaction liquid obtained by reacting n-hexane (40 ml), diisoamyl ether (27 g) and $TiCl_4$ (20 g) at 35° C. for 30 minutes, followed by reacting the mixture at 75° C. for one hour, filtering off, washing with n-hexane and drying to obtain a final solid product. Using this product, propylene polymerization was carried out as in Example 1.

EXAMPLE 20

A final solid product was obtained as in Example 1 except that butene-1 (6 g) was used in place of propylene (2.85 g) to obtain a solid product (II) subjected to polymerization treatment (20.9 g) (amount of butene-1 reacted: 0.9 g). Using the final solid product, propylene polymerization was carried out as in Example 1.

EXAMPLE 21

A final solid product was obtained as in Example 20 except that ethylene (4.0 g) was used in place of butene-1 (6 g) to obtain a solid product (II) subjected to polymerization treatment (20.6 g) (amount of ethylene reacted: 0.6 g). Using the final solid product, propylene polymerization was carried out.

EXAMPLE 22

In the same reactor as in the step (2) of Example 1 were placed and mixed n-pentane (4 ml), diethylaluminum monochloride (160 mg), the final solid product (22 mg) obtained in Example 1 and polypropylene powder (5 g), followed by removing n-pentane under reduced pressure, carrying out gas phase reaction while fluidizing the catalyst obtained above, with propylene gas under a partial pressure of propylene of 0.8 kg/cm²G at 30° C. for 20 minutes, and then removing unreacted propylene to obtain a preactivated catalyst (amount of propylene reacted, per g of the final solid product: 18 g). Using this catalyst, gas phase polymerization was carried out as in the step (3) of Example 1.

EXAMPLE 23

Di-n-butylaluminum monochloride (120 mg) and the final solid product (28 mg) obtained in Example 11 were placed in propylene (30 g) at 20° C., followed by reacting the mixture under 9.8 kg/cm²G for 10 minutes and removing unreacted propylene to obtain a preactivated catalyst in the form of powder (amount of propylene reacted per g of the final solid product: 100 g). Using this catalyst, gas phase polymerization of propylene was carried out as in the step (3) of Example 1.

EXAMPLE 24

Example 1 was repeated except that in the preactivation of the step (2) of Example 1, ethylene was used in place of propylene and ethylene was reacted under a partial pressure of ethylene of 1 kg/cm²G at 35° C. for 10 minutes (amount of ethylene reacted per g of the final solid product: 2.4 g).

EXAMPLE 25

Example 1 was repeated except that in the preactivation of Example 1, butene-1 was used in place of propylene and butene-1 was reacted under a partial pressure of butene of 0.5 kg/cm²G at 35° C. for 10 minutes (amounts of butene-1 reacted per g of the final solid product: 0.3 g).

EXAMPLE 26

Example 1 was repeated except that diisopropylaluminum monochloride (380 mg) was used in place of diethylaluminum monochloride (414 mg) in the step (2) of Example 1.

EXAMPLE 27

Preactivation was carried out as in the step (2) of Example 1 except that triethylaluminum (320 mg) was used in place of diethylaluminum monochloride (414 mg), and polymer was obtained as in the step (3) of Example 1 except that ethylene was polymerized under a hydrogen pressure of 12 kg/cm²G and an ethylene partial pressure of 12 kg/cm²G, at 85° C.

EXAMPLE 28

After a preactivated catalyst was prepared as in the steps (1) and (2) of Example 1, hydrogen (300 ml) and then propylene (600 g) were introduced, followed by bulk polymerization under a partial pressure of propylene of 31 kg/cm²G at 70° C. for one hour. After completion of the reaction, unreacted propylene was purged and post-treatment was carried out as in Example 1 to obtain a polymer.

EXAMPLE 29

A preactivated catalyst in the form of powder was prepared in a reactor as in the steps (1) and (2) of Example 1, followed by introducing hydrogen (300 ml) and propylene (200 g) and then carrying out bulk polymerization under a partial pressure of propylene of 26 kg/cm²G at 60° C. for 30 minutes (amount of propylene polymerized: 35 g). Thereafter, the resulting slurry containing unreacted propylene was flushed into a fluidized bed of 20 cm in diameter and 20 l in volume, equipped with agitating elements, while fluidizing polymer with propylene gas circulating at a flow rate of 5 cm/sec. to carry out gas phase polymerization at a reaction temperature of 70° C. under a partial pressure of propylene of 21 kg/cm²G for 2 hours. Post-treatment was then carried out as in Example 1 to obtain a polymer.

EXAMPLE 30

Bulk polymerization was carried out under a partial pressure of propylene of 26 kg/cm²G at 60° C. for 30 minutes as in Example 29, followed by transferring unreacted liquefied propylene into a separate feed tank connected to the reactor, raising the temperature of the reactor to 72° C. and carrying out gas phase polymerization for 2 hours while feeding propylene from the feed tank so as to give a polymerization pressure of 26 kg/cmG. Thereafter the same treatment was carried out as in Example 1 to obtain a polymer.

EXAMPLE 31

Bulk polymerization was carried out under 26 kg/cm²G, at 60° C. for 30 minutes as in Example 29.

The polymerization temperature was then raised up to 70° C. to give a polymerization pressure of 31 kg/cm$^2$G. When the polymerization was continued as it was, the pressure lowered down to 26 kg/cm$^2$G in 40 minutes. Thus the bulk polymerization moved continuously to gas phase polymerization. Gas phase polymerization was further carried out while feeding propylene for 60 minutes so as to keep the pressure at 26 kg/cm$^2$G. Post-treatment was carried out as in Example 1 to obtain a polymer.

EXAMPLE 32 n-Hexane (1,000 ml), diethylaluminum monochloride (320 mg) and the final solid product (30 mg) obtained in the step (1) of Example 1 were introduced into a reactor, and without preactivating them, the reaction product (G) used in the step (2) of Example 1 was introduced. Slurry polymerization was then carried out under a partial pressure of propylene of 10 kg/cm$^2$G at 85° C. for 3 hours, followed by removing n-hexane by steam stripping to obtain a polymer.

EXAMPLE 33

Propylene was subjected to slurry polymerization using the non-preactivated catalyst as in Example 32, followed by purging unreacted propylene and hydrogen and distilling off n-hexane under reduced pressure till n-hexane was contained in the polymer in an amount of 30%. This solvent-containing polymer was introduced into the fluidized bed equipped with agitating elements used in Example 29 and hydrogen (450 ml) was introduced to carry out gas phase polymerization under a partial pressure of propylene of 21 kg/cm$^2$G at 70° C. for 2 hours as in Example 29. Post-treatment was then carried out as in Example 1 to obtain a polymer.

EXAMPLE 34

Propylene-ethylene block copolymerization was carried out as in Example 33 except that the slurry polymerization of the first step was carried out with propylene, and as the gas phase polymerization of the second step, ethylene polymerization was carried out under a partial pressure of hydrogen of 8 kg/cm$^2$G and a partial pressure of ethylene of 12 kg/cm$^2$G at 70° C. for 2 hours.

EXAMPLE 35

Example 29 was repeated except that an α-olefin mixture of propylene (200 g) with ethylene (20 g) was used in place of using propylene (200 g) to obtain a polymer (propylene-ethylene copolymer).

EXAMPLE 36

Example 35 was repeated except that butene-1 (30 g) was used in place of using ethylene (20 g), to obtain a polymer (propylene-butene-1 copolymer).

EXAMPLE 37

The final solid product (300 mg) obtained in Example 1 and diethylaluminum monochloride (3,000 mg) were suspended in n-hexane (200 ml), followed by reaction under a partial pressure of propylene of 1.3 kg/cm$^2$G at 20° C. for 10 minutes, purging unreacted propylene, preserving the resulting material with stirring at 40° C. for one week, introducing the resulting catalyst slurry containing the final solid product (25 mg) into a polymerization vessel and then carrying out slurry polymerization and succeeding gas phase polymerization as in Example 33.

COMPARATIVE EXAMPLES 12, 13 and 14

Using each of the following solid products in place of the final solid product obtained in Example 1, the respective resulting catalyst slurries were preserved at 40° C. for one week as in Example 37:

Comparative example 12: the solid product (II) obtained in Example 1.

Comparative example 13: the solid product (II) subjected to polymerization treatment, obtained in Example 1.

Comparative example 14: the final solid product obtained in Comparative example 2.

The results of the above Examples and Comparative examples are shown in the following Table:

TABLE

| No. of Example and Comparative example | Polymer yield (g) per g of final solid product | Isotactic index | MFR* | YI** | BD of polymer | Proportion of 32 to 60 meshes sizes (%) | 150 meshes pass (%) | Congo Red test (time till color changes) | IR-τ |
|---|---|---|---|---|---|---|---|---|---|
| Ex. 1 | 13,000 | 99.2 | 4.8 | 0.5 | 0.50 | 99.0 | <0.1 | unchanged | 0.94 |
| Ex. 2 | 12,000 | 99.0 | 3.8 | 0.4 | 0.50 | 97.0 | <0.1 | unchanged | 0.94 |
| Ex. 3 | 14,000 | 98.5 | 12.0 | 0.4 | 0.48 | 96.0 | <0.1 | unchanged | 0.93 |
| Compar. ex. 1 | — | — | — | — | — | — | — | — | — |
| Compar. ex. 2 | 8,300 | 95.0 | 14.0 | 2.4 | 0.40 | 94.0 | <0.1 | unchanged | 0.91 |
| Compar. ex. 3 | — | — | — | — | — | — | — | — | — |
| Compar. ex. 4 | — | — | — | — | — | — | — | — | — |
| Ex. 4 | 11,000 | 99.0 | 4.6 | 0.8 | 0.49 | 97.0 | <0.1 | unchanged | 0.94 |
| Compar. ex. 5 | 1,200 | 96.0 | 3.9 | 18.0 | 0.45 | 58.0 | 4.9 | 30 sec. | 0.93 |
| Compar. ex. 6 | 1,300 | 96.4 | 3.6 | 15.9 | 0.44 | 60.0 | 3.8 | 30 sec. | 0.93 |
| Compar. ex. 7 | 8,500 | 99.0 | 3.4 | 1.6 | 0.48 | 97.5 | <0.1 | unchanged | 0.94 |
| Compar. ex. 8 | 7,200 | 98.4 | 4.3 | 2.9 | 0.48 | 98.0 | <0.1 | unchanged | 0.94 |
| Ex. 5 | 13,400 | 99.0 | 4.9 | 0.4 | 0.50 | 98.8 | <0.1 | unchanged | 0.93 |

TABLE-continued

| No. of Example and Comparative example | Polymer yield (g) per g of final solid product | Isotactic index | MFR* | YI** | BD of polymer | Proportion of 32 to 60 meshes sizes (%) | 150 meshes pass (%) | Congo Red test (time till color changes) | IR-τ |
|---|---|---|---|---|---|---|---|---|---|
| Ex. 6 | 13,600 | 98.8 | 5.2 | 0.4 | 0.50 | 98.9 | <0.1 | unchanged | 0.91 |
| Ex. 7 | 13,800 | 98.6 | 5.3 | 0.3 | 0.50 | 98.0 | <0.1 | unchanged | 0.90 |
| Ex. 8 | 12,900 | 99.0 | 4.8 | 0.5 | 0.50 | 99.0 | <0.1 | unchanged | 0.96 |
| Compar. ex. 9 | 6,200 | 88.0 | 9.6 | 3.4 | 0.44 | 92.0 | <0.1 | 5 min. | 0.88 |
| Compar. ex. 10 | 4,200 | 98.0 | 0.52 | 8.3 | 0.48 | 95.0 | <0.1 | 2 min. | 0.93 |
| Compar. ex. 11 | 6,200 | 98.5 | 1.9 | 4.1 | 0.48 | 95.2 | <0.1 | 5 min. | 0.93 |
| Ex. 9 | 12,800 | 98.9 | 4.2 | 0.4 | 0.50 | 96.0 | <0.1 | unchanged | 0.94 |
| Ex. 10 | 12,900 | 99.0 | 3.6 | 0.4 | 0.49 | 96.5 | <0.1 | unchanged | 0.93 |
| Ex. 11 | 13,200 | 98.8 | 3.2 | 0.4 | 0.50 | 94.0 | <0.1 | unchanged | 0.94 |
| Ex. 12 | 12,200 | 98.0 | 4.2 | 0.6 | 0.48 | 92.0 | <0.1 | unchanged | 0.94 |
| Ex. 13 | 12,000 | 98.2 | 3.6 | 0.7 | 0.49 | 92.1 | <0.1 | unchanged | 0.93 |
| Ex. 14 | 10,900 | 98.1 | 4.6 | 0.8 | 0.48 | 94.0 | <0.1 | unchanged | 0.93 |
| Ex. 15 | 12,400 | 99.0 | 4.3 | 0.6 | 0.49 | 96.0 | <0.1 | unchanged | 0.94 |
| Ex. 16 | 12,000 | 98.8 | 4.6 | 0.7 | 0.48 | 92.0 | <0.1 | unchanged | 0.94 |
| Ex. 17 | 13,600 | 99.0 | 4.2 | 0.3 | 0.50 | 94.0 | <0.1 | unchanged | 0.94 |
| Ex. 18 | 13,200 | 98.5 | 4.3 | 0.4 | 0.48 | 92.0 | <0.1 | unchanged | 0.93 |
| Ex. 19 | 13,000 | 98.0 | 3.6 | 0.5 | 0.49 | 96.0 | <0.1 | unchanged | 0.93 |
| Ex. 20 | 12,600 | 98.5 | 4.3 | 0.5 | 0.47 | 92.0 | <0.1 | unchanged | 0.94 |
| Ex. 21 | 12,000 | 98.2 | 4.1 | 0.6 | 0.45 | 93.0 | <0.1 | unchanged | 0.94 |
| Ex. 22 | 13,200 | 99.0 | 4.3 | 0.4 | 0.48 | 92.0 | <0.1 | unchanged | 0.94 |
| Ex. 23 | 13,100 | 99.1 | 3.8 | 0.4 | 0.49 | 91.0 | <0.1 | unchanged | 0.94 |
| Ex. 24 | 12,200 | 99.0 | 3.2 | 0.7 | 0.48 | 92.0 | <0.1 | unchanged | 0.94 |
| Ex. 25 | 12,800 | 98.8 | 4.1 | 0.5 | 0.49 | 91.0 | <0.1 | unchanged | 0.94 |
| Ex. 26 | 12,100 | 98.5 | 3.6 | 0.6 | 0.48 | 91.0 | <0.1 | unchanged | 0.94 |
| Ex. 27 | 11,800 | — | 4.4 | 0.8 | 0.46 | 93.0 | <0.1 | unchanged | — |
| Ex. 28 | 13,000 | 99.0 | 4.3 | 0.6 | 0.49 | 92.0 | <0.1 | unchanged | 0.94 |
| Ex. 29 | 13,200 | 99.2 | 4.3 | 0.4 | 0.48 | 95.0 | <0.1 | unchanged | 0.94 |
| Ex. 30 | 13,100 | 99.0 | 3.9 | 0.4 | 0.49 | 96.0 | <0.1 | unchanged | 0.94 |
| Ex. 31 | 13,400 | 98.8 | 3.6 | 0.3 | 0.50 | 94.0 | <0.1 | unchanged | 0.94 |
| Ex. 32 | 9,400 | 98.0 | 3.4 | 1.5 | 0.46 | 92.0 | <0.1 | unchanged | 0.94 |
| Ex. 33 | 13,900 | 98.1 | 3.0 | 0.3 | 0.46 | 94.0 | <0.1 | unchanged | 0.94 |
| Ex. 34 | 13,600 | 98.4 | 3.2 | 0.3 | 0.47 | 92.0 | <0.1 | unchanged | — |
| Ex. 35 | 13,600 | 99.0 | 4.0 | 0.3 | 0.47 | 92.0 | <0.1 | unchanged | 0.84 |
| Ex. 36 | 13,200 | 99.1 | 3.6 | 0.3 | 0.45 | 91.0 | <0.1 | unchanged | 0.90 |
| Ex. 37 | 12,400 | 99.0 | 4.6 | 0.8 | 0.48 | 92.0 | <0.1 | unchanged | 0.93 |
| Compar. ex. 12 | 1,400 | 96.2 | 3.8 | 14.0 | 0.46 | 62.0 | 8.9 | 30 sec. | 0.93 |
| Compar. ex. 13 | 1,500 | 96.4 | 3.6 | 13.2 | 0.47 | 64.0 | 6.2 | 1 min. | 0.93 |
| Compar. ex. 14 | 8,700 | 99.0 | 3.4 | 2.0 | 0.48 | 91.0 | <0.1 | un- | 0.93 |

TABLE-continued

| No. of Example and Comparative example | Polymer yield (g) per g of final solid product | Isotactic index | MFR* | YI** | BD of polymer | Proportion of 32 to 60 meshes sizes (%) | 150 meshes pass (%) | Congo Red test (time till color changes) | IR-τ |
|---|---|---|---|---|---|---|---|---|---|
| | | | | | | | | changed | |

*Melt flow rate (according to ASTMD-1238(L))
**Yellowness index (according to JIS K-7103)

What is claimed:

1. A process for producing alpha-olefin polymers which comprises:
   (a) reacting one mol of an organoaluminum compound ($A_1$) with 0.1 to 8 mols of an electron donor ($B_1$) in a solvent at a temperature of $-20°$ C. to $200°$ C., to obtain a reaction product (I);
   (b) reacting this reaction product (I) with $TiCl_4$ at a temperature of $0°$ to $200°$ C. in a ratio of the number of Al atoms to that of Ti atoms of 0.05 to 10, to form a solid product (II);
   (c) reacting 100 g of this solid product (II) with 10 to 1,000 g of an electron donor ($B_2$) and 10 to 1,000 g of an electron acceptor at a temperature of $40°$ to $200°$ C. to obtain a solid product (III);
   (d) during or/and after the reaction step (b) or/and during or/and after the reaction step (c), subjecting the solid product (II) or (III) to a polymerization treatment of contacting the product (II) or (III) with 10 to 5,000 g of an alpha-olefin based on 100 g of the solid product (II) or (III), under the atmospheric pressure, or adding said alpha-olefin to the solid product (II) or (III) so as to give a pressure of 10 kg/cm²G or lower, and at a reaction temperature of $30°$ to $90°$ C., to obtain a final solid product;
   (e) containing 1 g of said final solid product from step (d) with 0.1 to 500 g of an organoaluminum compound ($A_2$);
   (f) adding to combination of the step (e), 0.05 to 10 g of a reaction product (G) obtained by reacting 1 mol of an organoaluminum compound ($A_3$) with 0.01 to 5 mols of an electron donor ($B_3$), such reaction being carried out at a temperature of $-30°$ to $100°$ C.,
   (g) subjecting the product resulting from step (e) or the product resulting from step (f) to a preactivation treatment with 0.01 to 5000 g of an olefin to thereby obtain a preacticated catalyst, and
   (h) polymerizing an alpha-olefin or alpha-olefins with the preactivated catalyst resulting from step (g).

2. A process according to claim 1 wherein after completion of the reaction of the reaction product (I) with $TiCl_4$, said polymerization treatment of step (d) is carried out by removing the resulting liquid portion, suspending the resulting solid product in a solvent to form a suspension and adding an organoaluminum compound and an alpha-olefin under 0 to 10 kg/cm²G to the suspension to polymerize the alpha-olefin.

3. A process according to claim 1 wherein after completion of the solid product (II) with an electron donor and an electron acceptor, said polymerization treatment according to step (d) is carried out by removing the resulting liquid portion, suspending the resulting solid product (III) in a solvent to form a suspension and an organoaluminum compound and an alpha-olefin under 0 to 10 kg/cm²G to the suspension to polymerize the alpha-olefin.

4. A process according to claim 1 wherein the amounts of said organoaluminum compound in step (e) and said alpha-olefin in step (g) added are in the range of 5 to 500 g and in the range of 10 to 5,000 g, respectively, each based on 100 g of the solid product (II), and the reaction temperature is in the range of $30°$ to $90°$ C.

5. A process according to claim 3 wherein the amounts of said organoaluminum compound in step (e) and said alpha-olefin in step (g) added are in the range of 5 to 500 g and in the range of 10 to 5,000 g, respectively, each based on 100 g of the solid product (III), and the reaction temperature is in the range of $30°$ to $90°$ C.

6. A process according to claim 1 wherein the reaction product (I) in the form of liquid, obtained by reacting an organoaluminum compound with an electron donor is used, as it is, in step (b).

7. A process according to claim 1 wherein said alpha-olefin polymerization of step (h) is carried out by gas phase polymerization.

8. A process according to claim 1 wherein said alpha-olefin polymerization of step (h) is carried out by slurry polymerization followed by gas phase polymerization.

9. A process according to claim 1 wherein said alpha-olefin polymerization of step (h) is carried out by bulk polymerization followed by gas phase polymerization.

10. A process according to claim 1 wherein said organoaluminum compounds ($A_1$) and ($A_2$) are expressed by the general formula $$AlR_nR'_{n'}X_{3-(n+n')}$$

wherein R and R' each represent alkyl, aryl, alkaryl, cycloalkyl or alkoxy group; X represents fluorine, chlorine, bromine or iodine; and n and n' each represent a number satisfying a relationship of $0 < n+n' \leq 3$.

11. A process according to claim 1 wherein said electron donors ($B_1$) and ($B_2$) are same or different and each are at least one member selected from the group consisting of ethers, alcohols, esters, aldehydes, fatty acids, aromatic acids, ketones, nitriles, amines, amides, ureas, thioureas, isocyanates, azo compounds, phosphines, phosphites, phosphinites, hydrogen sulfide, thioethers and thioalcohols, organic compounds among the foregoing each containing 1 to 15 carbon atoms.

12. A process according to claim 1 wherein said electron donors ($B_1$) and ($B_2$) are same or different and are composed singly or mainly of ethers and those other than ethers are employed together with ethers.

13. A process according to claim 1 wherein said electron acceptor is at least one member selected from the group consisting of anhydrous $AlCl_3$, $SiCl_4$, $SnCl_2$, $SnCl_4$, $TiCl_4$, $ZrCl_4$, $PCl_3$, $VCl_4$ and $SbCl_5$.

14. A process according to claim 1 wherein said solvent is an aliphatic hydrocarbon.

15. A process according to claim 1 wherein said reaction of solid product (II) with an electron donor and an electron acceptor is carried out in an aliphatic hydrocarbon.

16. A process according to claim 1 wherein said reaction of said solid product (II) with an electron donor (B$_2$) and an electron acceptor is carried out by reacting said electron donor with said electron acceptor in advance at a temperature of 10° to 100° C. for a time of 30 minutes to 2 hours; cooling the resulting reaction product down to 40° C. or lower; and reacting this reaction product with said solid product (II).

17. A process according to claim 1 wherein in steps (e), (f) and (g) there are used 0.1 to 500 g of an organoaluminum compound, 0 to 50 l. of a solvent, 0 to 1,000 ml of hydrogen and 0.05 to 5,000 g of an alpha-olefin, each based on 1 g of the final solid product resulting from step (d) and reacting said alpha-olefin introduced in step (g) at a temperature of 0° to 100° C. to form 0.01 to 2,000 g of said alpha-olefin reacted, based on 1 g of the final solid product resulting from step (d).

18. A process according to claim 1 wherein the reaction temperature in the step (b) is in the range of 10° to 90° C.

19. A process according to claim 1 wherein the combination of 1 g of said final solid product of step (d) with 0.1 to 500 g of an organoaluminum compound (A$_2$) according to the step (e) is subjected to preactivation treatment in accordance with step (g) with 0.01 to 5000 g of an alpha-olefin and thereafter adding said reaction product (G).

20. A process according to claim 1 wherein said polymerization treatment of step (d) is carried out so that the polymerized amount of said alpha-olefin is 0.01 to 2,000 g per g of said solid product (II) or (III).

* * * * *